(12) United States Patent
Shimizu et al.

(10) Patent No.: US 7,749,410 B2
(45) Date of Patent: Jul. 6, 2010

(54) METHOD OF FABRICATING POLYMER OPTICAL CIRCUIT

(75) Inventors: Keishi Shimizu, Kanagawa (JP); Akira Fujii, Kanagawa (JP); Toshihiko Suzuki, Kanagawa (JP); Kazutoshi Yatsuda, Kanagawa (JP); Shigemi Ohtsu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/099,312

(22) Filed: Apr. 8, 2008

(65) Prior Publication Data

US 2009/0079099 A1    Mar. 26, 2009

(30) Foreign Application Priority Data

Sep. 20, 2007    (JP) .............................. 2007-243320

(51) Int. Cl.
*B29D 11/00* (2006.01)
(52) U.S. Cl. ........................................ 264/1.24; 264/1.1
(58) Field of Classification Search ................ 264/1.24
See application file for complete search history.

(56) References Cited

U.S. PATENT DOCUMENTS 7,029,607 B2    4/2006   Shimizu et al.

| | | |
|---|---|---|
| 2004/0037530 A1 | 2/2004 | Ohtsu et al. |
| 2005/0158003 A1* | 7/2005 | Ohtsu et al. ................ 264/1.24 |
| 2005/0285287 A1* | 12/2005 | Okumura et al. ............. 264/2.5 |
| 2006/0177188 A1* | 8/2006 | Ishizaki et al. .............. 385/129 |
| 2007/0253071 A1* | 11/2007 | Buchon ...................... 264/1.1 |

FOREIGN PATENT DOCUMENTS

| JP | 2000-298221 A | 10/2000 |
|---|---|---|
| JP | 2004-078084 A | 3/2004 |
| JP | 2004-086144 A | 3/2004 |
| JP | 2004-109926 A | 4/2004 |
| JP | 2005-181645 A | 7/2005 |
| JP | 2006-011179 A | 1/2006 |

* cited by examiner

*Primary Examiner*—Khanh Nguyen
*Assistant Examiner*—John Blades
(74) *Attorney, Agent, or Firm*—Sughrue Mion, PLLC (57) ABSTRACT

A method of fabricating a polymer optical circuit is provided. The method includes structuring a mold with a main mold and an auxiliary mold. The main mold has a first concavity corresponding to a first portion of the waveguide core, a second concavity corresponding to an end portion of the waveguide core with a specific shape, an injection hole for injecting a resin into the concavities, and a suction hole for suctioning-out the resin. The auxiliary mold has a shape corresponding to the specific shape of the end portion of the waveguide core. The method also includes firmly sticking a clad base film to a surface of the mold where the concavities are formed; filling the concavities with resin by injecting the resin via the injection hole and suctioning the resin via the suction hole; and forming the waveguide core by curing the resin.

5 Claims, 9 Drawing Sheets

METHOD OF FABRICATING POLYMER OPTICAL CIRCUIT

CROSS-REFERENCE TO RELATED APPLICATION

This application claims priority under 35 USC 119 from Japanese Patent Document 2007-243320 filed Sep. 20, 2007.

BACKGROUND OF THE INVENTION

1. Field of the Invention

The present invention relates to a method of fabricating a polymer optical circuit.

2. Description of the Related Art

The following have been proposed as methods of fabricating a polymer optical circuit: (1) a method of impregnating a film with a monomer, selectively exposing a core portion so as to change the refractive index, and laminating films together (a selective polymerization method); (2) a method of coating a core layer and a clad layer, and thereafter, forming a clad portion by using reactive ion etching (RIE method); (3) a method using photolithography which carries out exposure and development by using an ultraviolet curable resin which is obtained by adding a photosensitive material into a polymer material (a direct exposure method); (4) a method using injection molding; (5) a method of coating a core layer and a clad layer, and thereafter, exposing a core portion so as to change the refractive index of the core portion (a photobleaching method); and the like.

Thereamong, attention has focused on the following method as a method by which a polymer optical circuit having little transmission loss of the waveguide core can be fabricated: a film for a clad is firmly stuck to the surface at the side where a concavity is formed at a silicone rubber mold in which the concavity corresponding to the pattern of the waveguide core is formed, and a resin for waveguide core formation is injected into the concavity and cured so as to form the waveguide core at the surface of the film for the clad (Japanese Patent Applications Laid-Open Nos. 2004-086144, 2004-109926).

It is often the case that polymer optical circuits are made able to be connected to light emitting/receiving elements by forming an inclined mirror having an approximately 45° angle with respect to the optical axis of the waveguide core, or by forming a convex lens, at the final end of the waveguide core. The inclined mirror has an angle of about 30° to 60°, and functions to couple, to the waveguide core, light which propagates in the normal direction of the surface at which the waveguide pattern is formed. Accordingly, the angle of a usual inclined mirror is formed to be 45°.

In polymer optical circuits fabricated by the methods disclosed in aforementioned JP-A Nos. 2004-086144 and 2004-109926, an inclined mirror can be formed by cutting the final end of the waveguide core by a dicing saw having a dicing blade whose distal end is substantially V-shaped.

However, when an inclined mirror is formed at the final end portion of a waveguide core, the surface roughness of the inclined mirror must be made to be less than or equal to $1/10$ of the wavelength of the light which propagates through the waveguide core. Accordingly, when the inclined mirror is to be finished by a dicing saw, precision cutting by the dicing saw must be carried out, and polishing processing must be carried out separately if necessary.

Here, in a cutting process by a dicing saw, the processing time is determined in accordance with the feed speed of the dicing blade. When a 45° surface is to be finished by a dicing saw, the feed speed of the dicing blade cannot be set to be high, and therefore, a long time is required for the processing. Further, when an inclined mirror is to be formed at a waveguide core, a dicing blade for a 45° surface and a dicing blade for cutting-off perpendicularly are separately required, and retooling becomes complex.

Further, at a dicing saw, the optical path changing direction of an inclined mirror can only be made to be the direction in which the dicing saw has an attracting surface. Therefore, when forming an inclined mirror at the final end of a waveguide core at a polymer optical circuit, there is the need to machine one final end first, and then, after peeling the polymer optical circuit off from a dicing tape and reversing the front and back thereof, again affix it to a dicing tape and machine the other final end. Accordingly, if inclined mirrors are to be formed at the both end portions of a polymer optical circuit, as compared with a case in which an inclined mirror is to be formed at only one end portion, the number of processes increases, and further, the amount of the dicing tape which is used doubles. Moreover, there is also the possibility that the positional relationship between the two inclined mirrors will be disturbed due to an error in the affixing position at the time when the polymer optical circuit is affixed to the dicing tape the second time.

Thus, the following methods have been proposed as methods of shaping a final end of a waveguide core without using a dicing saw: a method of placing an optical waveguide at a die and forming the inclined mirror by punching by a punch (JP-A No. 2006-011179); a method of injecting a core material into a mold of a predetermined shape and curing the core material so as to form a waveguide core having inclined mirrors at the both ends, and forming a convex lens for light collection by stamping by a mold at the clad layer which surrounds the waveguide core (JP-A No. 2005-181645); a method of forming a waveguide core by photolithography, wherein an inclined mirror is formed by changing the exposure conditions of a waveguide core end portion (JP-A No. 2000-298221); a method of forming a waveguide core by using a silicone rubber mold, wherein portions corresponding to inclined mirrors are formed at both ends of the silicone rubber mold (JP-A No. 2004-078084); and the like.

SUMMARY OF THE INVENTION

In accordance with an aspect of the present invention, there is provided a method of fabricating a polymer optical circuit having a waveguide core whose one or both end portions have a predetermined shape, and a clad surrounding the waveguide core, the method including: structuring a mold including a main mold made of an elastomer for mold formation and having: a concavity corresponding to a portion of the waveguide core except for the end portion of the specific shape, an injection hole for injecting a resin for core formation into the concavity, and a suction hole for suctioning-out the resin for core formation injected in the concavity from the injection hole, and an auxiliary mold made of an elastomer for mold formation and having a concavity of a shape corresponding to the end portion of the specific shape of the waveguide core; firmly sticking a clad base film, that structures a portion of the clad, to a surface of the mold at a side where the concavity is formed; filling a resin for core formation into the concavity by injecting the resin for core formation into the concavity from the injection hole of the mold and suctioning the resin for core formation from the suction hole; and forming a waveguide core by curing the resin for core formation.

BRIEF DESCRIPTION OF THE DRAWINGS

FIG. 3 is an explanatory drawing showing a state in which the mold shown in FIG. 1 and FIG. 2 is firmly stuck to a clad base film, and a resin for core formation is injected;

DESCRIPTION OF THE PREFERRED EMBODIMENTS

First Exemplary Embodiment

Figure 5A:
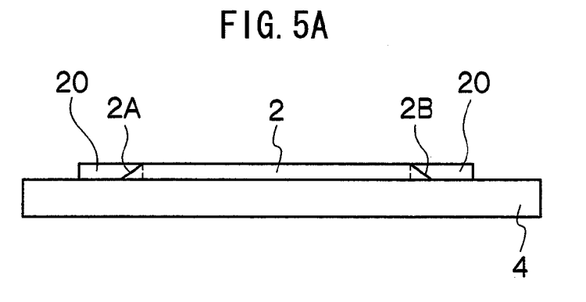
FIGS. 5A through 5D are flow diagrams showing procedures of forming a clad layer after the main mold has been removed.
Figure 5B:
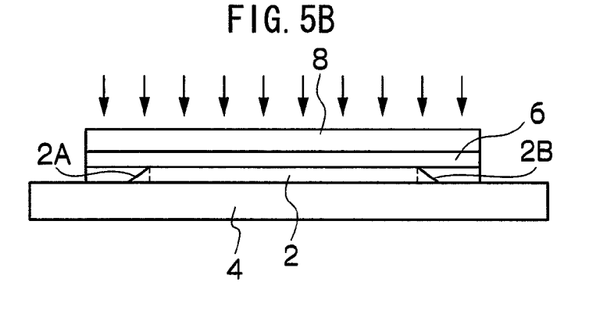
Figure 5C:
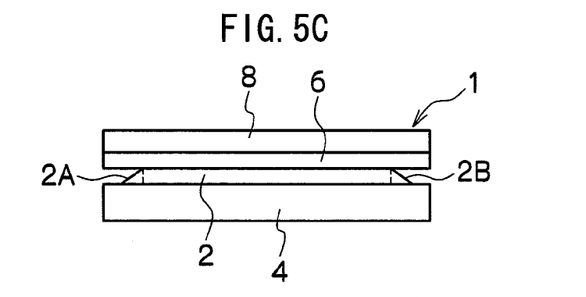
Figure 5D:
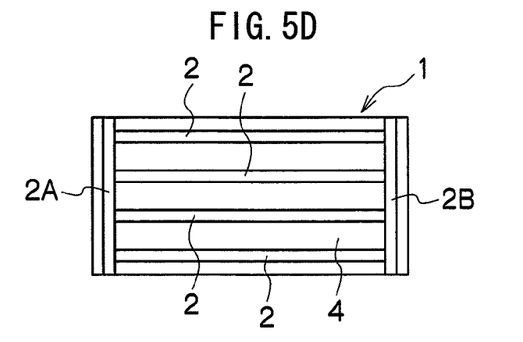

Hereinafter, an example will be described in which a method of fabricating a polymer optical circuit of the present invention is applied to the fabrication of a polymer optical circuit 1 which, as shown in FIG. 5C and FIG. 5D, has four waveguide cores 2, and in which inclined mirrors 2A, 2B are formed at the both ends of the respective waveguide cores 2.

Figure 1:
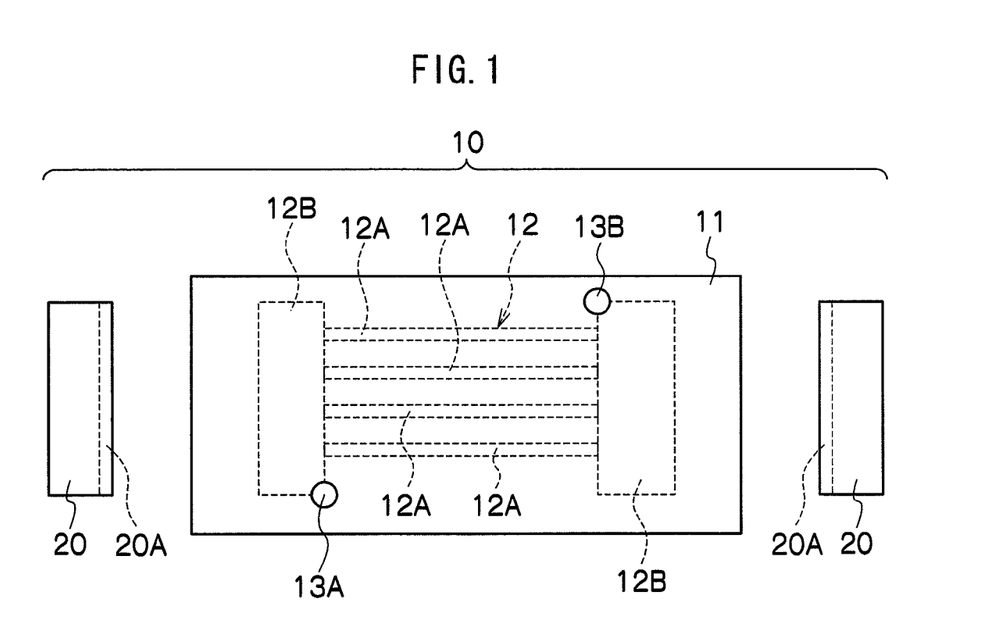
FIG. 1 is an exploded plan view showing the structure of a mold used in fabricating a polymer optical circuit relating to a first exemplary embodiment.
Figure 2:
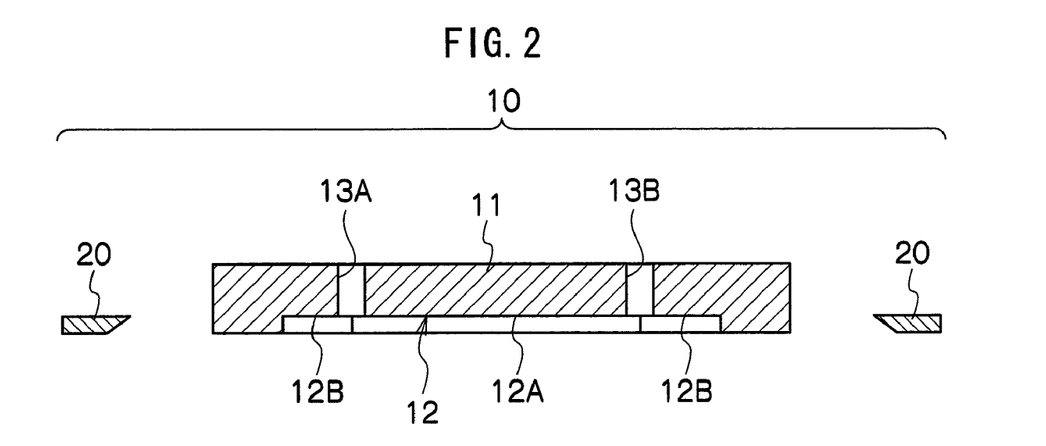
FIG. 2 is an exploded cross-sectional view showing the structure of the mold used in fabricating the polymer optical circuit relating to the first exemplary embodiment.
Figure 3:
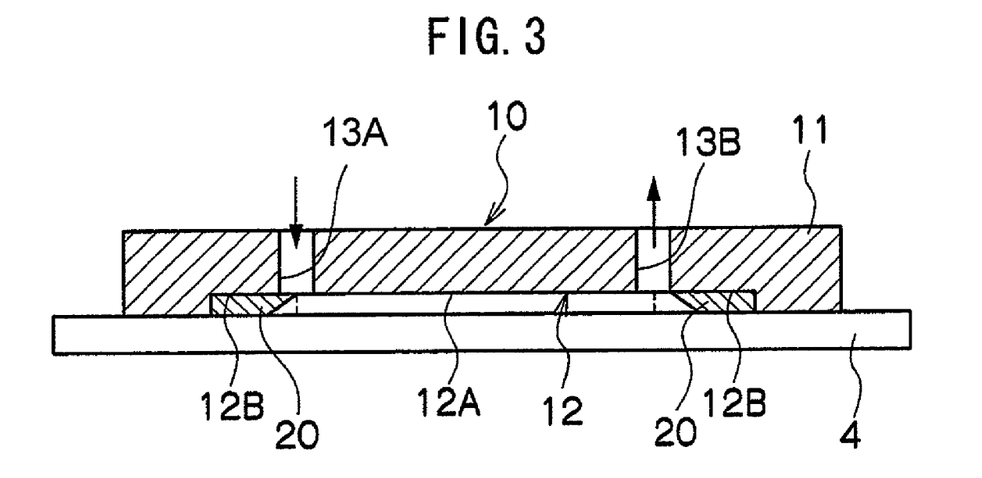

As shown in FIG. 1 through FIG. 3, a mold 10 used in the fabricating method of the first exemplary embodiment is formed from a main mold 11 for forming the waveguide cores 2 of the polymer optical circuit 1, and auxiliary molds 20 for forming the inclined mirrors 2A, 2B.

Concavities 12 are formed in the bottom surface, in FIG. 1 and FIG. 2, of the main mold 11. The concavities 12 are divided into groove-shaped concavities 12A corresponding to the waveguide cores 2, and a pair of rectangular concavities 12B which communicate with the one and the other end portions of the concavities 12A and into which the auxiliary molds 20 are fit.

An injection hole 13A, which is for the injection of a resin for core formation, which will be described later, into the concavities 12, is formed in the corner portion of one of the concavities 12B at the side near the concavities 12A. A suction hole 13B, which is for sucking of the resin for core formation that was injected in the concavities 12, is formed in the corner portion of the other of the concavities 12B at the side near the concavities 12A. The injection hole 13A and the suction hole 13B are positioned opposite one another across the central point of the main mold 11.

The main mold 11 is formed by an elastomer for mold formation being made to flow-in to an original plate at which convex portions corresponding to the concavities 12 are formed on a substrate of silicon or quartz glass or the like, and by curing the elastomer by an appropriate means such as heat curing, photo-curing, or the like.

The auxiliary molds 20 are formed from an elastomer for mold formation, and, as shown in FIG. 3, are rectangular members which are fit into the concavities 12B of the main mold 11. An end surface forming surface 20A, which is for forming end surfaces of the waveguide cores 2, is formed at one long side of each of the auxiliary molds. In the example shown in FIGS. 1 through 3, the end surface forming surfaces 20A are 45° surfaces which form angles of 45° with respect to the optical axes of the waveguide cores 2. The auxiliary molds 20 are fit into the concavities 12B of the main mold 11 such that the end surface forming surfaces 20A face downward.

The end surface forming surface 20A is not limited to a 45° surface which is directed downward, and can be selected variously in accordance with the shapes of the final ends of the waveguide cores 2.

Figure 6A:
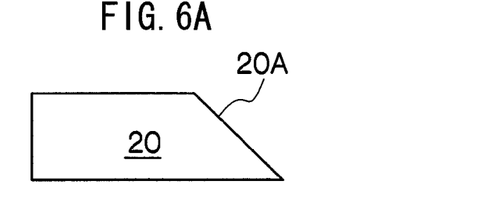
FIGS. 6A through 6G are cross-sectional views showing examples of cross-sectional shapes of an auxiliary mold used at the mold shown in FIG. 1 and FIG. 2.
Figure 6B:
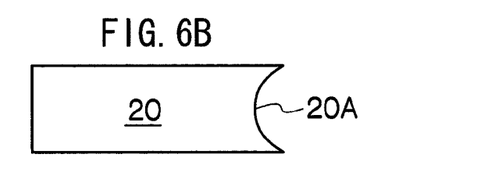

For example, the end surface forming surface 20A may be a 45° surface that faces upward as shown in FIG. 6A, or may be a groove having a round cross-section and facing the concavities 12A as shown in FIG. 6B. Or, the end surface forming surface 20A may be a concave sunken surface that faces upward as shown in FIG. 6C, or may be a groove having a round cross-section and facing downward as shown in FIG. 6D.

The auxiliary mold 20, whose end surface forming surface 20A is the form shown in FIG. 6A, is used in forming the inclined mirrors at the final ends of the waveguide cores 2. The auxiliary mold 20, whose end surface forming surface 20A is the form shown in FIG. 6B, is used for forming convex lenses at the final end surfaces of the waveguide cores 2. Further, the auxiliary mold 20, whose end surface forming surface 20A is the form shown in FIG. 6D, is used in forming the convex lenses at the top surfaces of the end portions of the waveguide cores 2.

Further, in the fabricating method of the present invention, because the resin for core formation is injected into the concavities 12 of the mold 10 at a low pressure, the resin for core formation does not flow into the gaps between the main mold 11 and the auxiliary molds 20. Accordingly, a mold, which is formed by layering the auxiliary molds 20 of the forms shown in FIGS. 6A through 6D in the direction of thickness, may be used as the auxiliary mold.

Figure 6C:
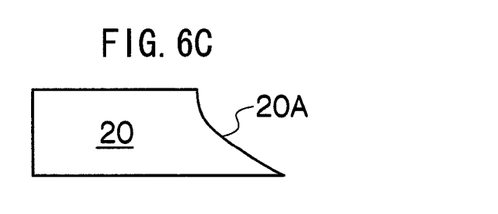
Figure 6D:
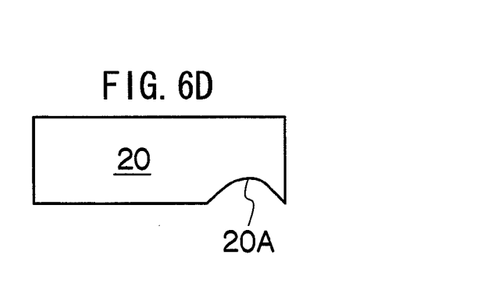
Figure 6E:
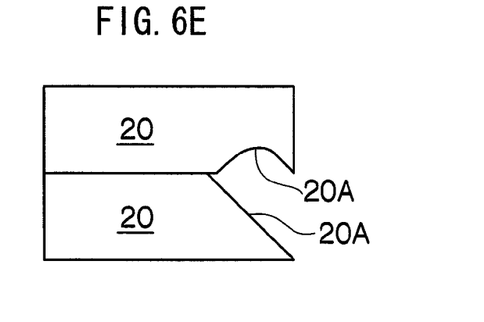
Figure 6F:
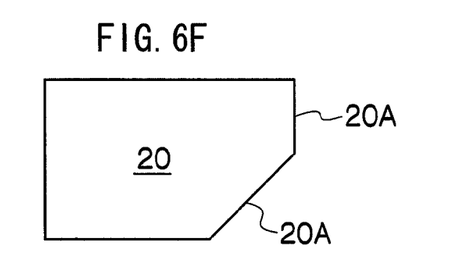
Figure 6G:
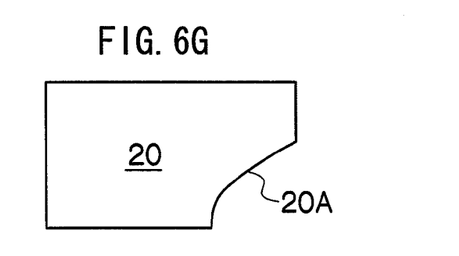
Figure 7A:
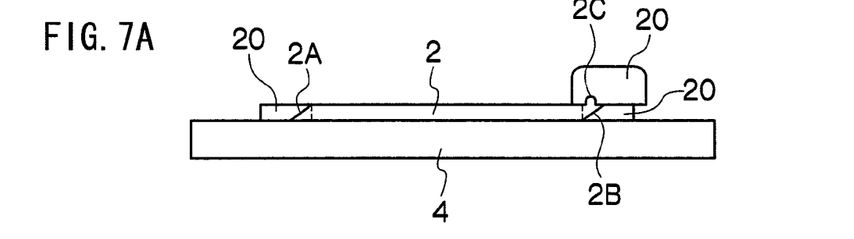
FIGS. 7A through 7D are flow diagrams showing another example of a polymer optical circuit fabricated by the fabricating method of the first exemplary embodiment, and the fabricating procedures thereof.
Figure 7B:
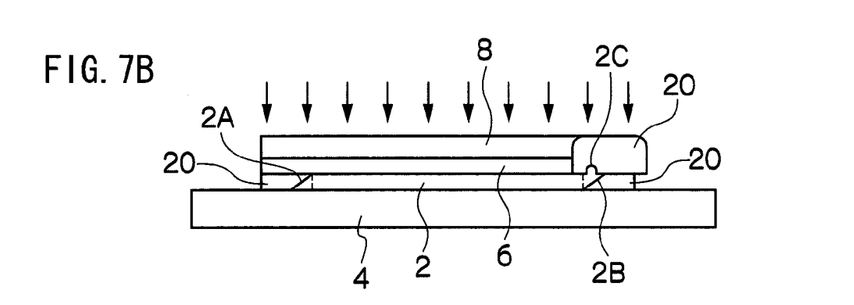
Figure 7C:
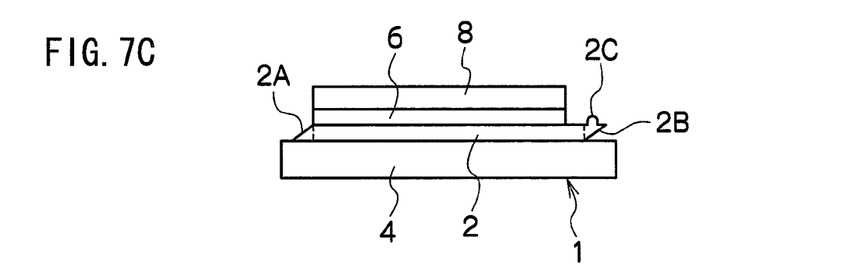
Figure 7D:
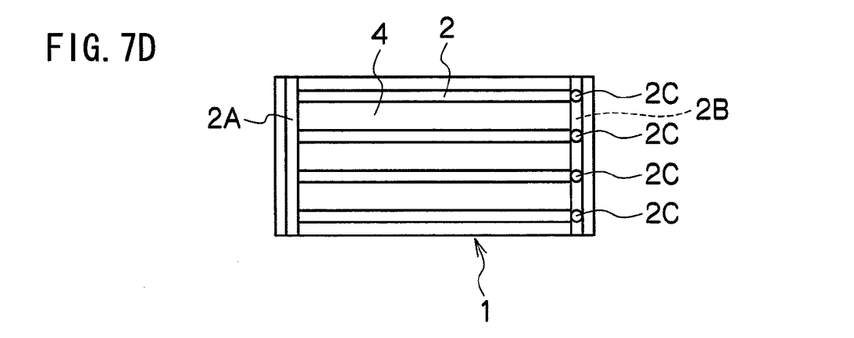

The following are examples of molds formed by layering the auxiliary molds 20: as shown in FIG. 6E, a mold of a form in which the auxiliary mold 20 shown in FIG. 6A and the auxiliary mold 20 shown in FIG. 6D are layered; a mold of the form shown in FIG. 6F in which the auxiliary mold 20 of the form shown in FIG. 6A is turned upside-down and is layered with the auxiliary mold 20 having a rectangular cross-section; a mold of the form shown in FIG. 6G in which the auxiliary mold 20 of the form shown in FIG. 6C is turned upside-down and is layered with the auxiliary mold 20 having a rectangular cross-section; and the like.

It is preferable that the cured product of the elastomer for mold formation, which is used in forming the main mold 11 and the auxiliary molds 20, can be easily peeled off from the original plate, and has mechanical strength/dimensional stability of a given level or more as the main mold 11 and the auxiliary molds 20 (used repeatedly), and has a hardness (a degree of hardness) that maintains the concavities 12, and has a good ability to stick firmly to a clad base film 4. Various types of additives can be added as needed to the elastomer for mold formation.

The elastomer for mold formation can be coated or cast or the like on the surface of the original plate, and further, the convex portions, which are formed at the original plate and correspond to the individual waveguide cores, must be transferred accurately to the elastomer for mold formation. Therefore, the elastomer for mold formation preferably has a viscosity of less than or equal to a given limit, e.g., about 500 to 7000 mPa·s. (Note that the "elastomer for mold formation" used in the present invention also includes rubber-like bodies which are elastic after curing.) Further, solvents can be added in order to adjust the viscosity, to the extent that adverse effects of the solvent do not arise.

From the standpoints of the aforementioned peelability, mechanical strength/dimensional stability, hardness and ability to stick firmly to the clad base film, curable organopolysiloxanes which become silicone rubbers (silicone elastomers) or silicone resins after curing are preferably used as the elastomer for mold formation. The curable organopolysiloxane preferably includes a methylsiloxane group, an ethylsiloxane group, or a phenylsiloxane group in the molecule. Further, the curable organopolysiloxane may be a one-liquid type, or may be a two-liquid type which is combined with a curing agent. Further, the curable organopolysiloxane may be heat curable or room temperature curable (e.g., is cured by moisture in the air), or curable by another means (ultraviolet curable, or the like).

The curable organopolysiloxane preferably becomes a silicone rubber after curing. What are usually called liquid silicone rubbers ("liquid" also includes silicone rubbers whose viscosity is high, such as in the form of a paste) are used therefor, and two-liquid types which are used by being combined with a curing agent are preferable. Thereamong, addition-type liquid silicone rubbers are preferably used because they are cured in a short time and uniformly at the surface and the interior thereof, there are no or few by-products at that time, they have excellent mold releasability, and the shrinkage factors thereof are small.

Among such liquid silicone rubbers, liquid dimethylsiloxane rubber in particular is preferable from the standpoints of the ability to stick firmly, peelability, strength, and hardness. Further, the cured product of liquid dimethylsiloxane rubber generally has a low refractive index of about 1.43. Therefore, a mold formed therefrom can be utilized as a clad layer as is without being peeled-off from a clad base film. In this case, some measure must be taken so that the mold, and the filled resin for core formation and the clad base film, do not peel apart.

From the standpoints that the convex portions corresponding to the waveguide cores 2 are transferred accurately, and that there is little mixing-in of air bubbles and defoaming is easy, and that a mold of a thickness of several millimeters is formed, the viscosity of the liquid silicone rubber is preferably about 500 to 7000 mPa·s, and more preferably about 2000 to 5000 mPa·s.

The surface energy of the main mold 11 and the auxiliary molds 20 being in the range of 10 dyn/cm to 30 dyn/cm, and preferably 15 dyn/cm to 24 dyn/cm, is preferable from the standpoint of the aforementioned ability to stick firmly to the clad base film 4.

The Share rubber hardness of the main mold 11 being 15 to 80 and preferably 20 to 60 is preferable from the standpoints of the templating performance, maintaining of the shapes of the concavitys, and peelability.

The surface roughness (root mean square (RMS) roughness) of the main mold 11 and the auxiliary molds 20 is less than or equal to 0.2 μm and is preferably less than or equal to 0.1 μm from the standpoint of forming the inclined mirrors without a dicing process or polishing.

The main mold 11 and the auxiliary molds 20 are preferably light-transmissive in the ultraviolet region and/or the visible region. It is preferable that the main mold 11 and the auxiliary molds 20 are light-transmissive in the visible region because, when the main mold 11 is stuck firmly to the clad base film 4, positioning can be carried out easily, and further, the state of the resin for core formation being filled into the concavities 12 can be observed such that completion of filling and the like can be easily recognized. Further, when using an ultraviolet curable resin as the resin for core formation, it is preferable that the transmissivity in the ultraviolet region (250 nm to 400 nm) of the main mold 11 and the auxiliary molds 20 be greater than or equal to 80% from the standpoint of making the mold transparent and carrying out ultraviolet curing.

The aforementioned curable organopolysiloxanes, and thereamong, liquid silicone rubbers that become silicone rubbers after curing, are excellent in terms of the mutually-contradictory properties of the ability to stick firmly to and the peelability from the clad base film 4 which will be described later, and have the ability to transfer nano-structures, and can even prevent entry of liquid when the silicone rubber and clad base film are stuck firmly. The mold 10 which is formed from the main mold 11 and the auxiliary molds 20 using such a silicone rubber transfers the original plate with high accuracy and sticks firmly to the clad base film 4 well. Therefore, the resin for core formation can be filled efficiently only into the concavities 12 between the mold 10 and the clad base film 4, and further, the peeling of the main mold 11 from the clad base film 4 is easy. Accordingly, a polymer optical waveguide which maintains shape with high accuracy can be fabricated extremely simply from the mold 10.

When the mold 10 is formed from the main mold 11 and the auxiliary molds 20, as shown in FIG. 3, the clad base film 4 is made to stick firmly to the surface of the mold 10 at the side at which the concavities 12 are formed. The resin for core formation can be filled in the concavities 12 by injecting the resin for core formation into the concavities 12 from the injection hole 13A and suctioning the resin for core formation from the suction hole 13B.

Because the polymer optical circuit 1 can be used as an optical wire between couplers or boards or as an optical branching filter or the like, the material of the clad base film 4 is selected in accordance with the application and in consideration of the optical properties such as the refractive index, light-transmissivity and the like, mechanical strength, heat-resistance, ability to stick firmly to the mold, flexibility, and the like.

A film-like base material which is flexible is preferably used as the clad base film 4, but, depending on the application, a rigid base material may be used.

Examples of the clad base film 4 which is flexible are alicyclic acrylic resin films, alicyclic olefin resin films, cellulose triacetate films, fluorine-containing resin films, and the like. To ensure a difference in refractive indices with respect to the core, the refractive index of the clad base film is smaller than 1.55, and preferably smaller than 1.53.

OZ-1000, OZ-1100 (manufactured by Hitachi Kasei K K) or the like, in which an aliphatic cyclic hydrocarbon such as tricyclodecane or the like is introduced in an ester substituent, is used as the alicyclic acrylic resin film.

Further, examples of the alicyclic olefin resin films are those having a norbornene structure at the main chain, and those having a norbornene structure at the main chain and a polar group such as an alkyloxycarbonyl group (the alkyl group may be an alkyl group of 1 to 6 carbon atoms or a cycloalkyl group) or the like at the side chain. Thereamong, the aforementioned alicyclic olefin resins having a norbornene structure at the main chain and a polar group such as an alkyloxycarbonyl group or the like at the side chain have excellent optical characteristics such as a low refractive index (the refractive index is around 1.50 which can ensure a difference in refractive indices between the core and the clad) and high light transmissivity and the like, and further, have an excellent ability to stick firmly to the mold and excellent heat resistance, and are therefore particularly suited to the fabrication of a polymer optical waveguide of the present invention.

The thickness of the clad base film 4 is appropriately selected in consideration of flexibility, rigidity, ease of handling, and the like, and generally, about 0.05 mm to 0.5 mm is preferable.

When the clad base film 4 is stuck firmly to the mold 10, the resin for core formation is injected in from the injection hole 13A.

The resin for core formation which is injected in from the injection hole 13A is filled into the concavities 12 of the mold 10 by the capillary phenomenon, and is discharged-out from the suction hole 13B. Any of radiation curable resins, ultraviolet curable resins, electron beam curable resins, and heat curable resins can be used as the resin for core formation. Thereamong, ultraviolet curable resins and heat curable resins are preferably used.

Ultraviolet curable or heat curable monomers, oligomers, or mixtures of monomers and oligomers are preferably used as the ultraviolet curable resin or heat curable resin which is used as the resin for core formation.

Further, epoxy ultraviolet curable resins and acrylic ultraviolet curable resins are preferably used as the ultraviolet curable resin.

The resin for core formation must have a viscosity which is low enough to be filled by the capillary phenomenon into the gaps formed between the concavities 12 of the mold 10 and the clad base film 4. Accordingly, the viscosity of the curable resin is 10 mPa·s to 2000 mPa·s, and preferably 20 mPa·s to 1000 mPa·s, and even more preferably 30 mPa·s to 500 mPa·s.

In addition, in order to be able to reproduce with high accuracy the shapes of the waveguide cores 2 and the inclined mirrors 2A, 2B which are formed at the original plate, the change in volume of the resin for core formation before and after curing must be small. For example, a decrease in volume causes optical loss of a wave guide. Accordingly, a resin whose volume change is as small as possible is preferably used as the resin for core formation, and the change in volume thereof is less than or equal to 10% and preferably less than or equal to 6%. If possible, it is preferable to avoid lowering the viscosity by using a solvent, because the change in volume before and after curing is large.

In order to make the change in volume (shrinkage) after curing of the resin for core formation small, a polymer can be added to the resin. The polymer preferably is compatible with the resin for core formation and does not adversely affect the aforementioned refractive index, elastic modulus and light transmitting characteristic of the resin. By adding a polymer, not only is the change in volume made to be small, but also, the viscosity and glass transition point of the cured resin can be controlled to a high degree. For example, acrylic polymers, methacrylate polymers and epoxy polymers are used as the polymer, but the polymer is not limited to them.

The refractive index of the cured product of the resin for core formation must be greater than the refractive index of the clad base film 4 which becomes the clad, and is greater than or equal to 1.50, and preferably greater than or equal to 1.53. The difference in the refractive indices of the clad (including the clad layer in following process (5)) and the core is greater than or equal to 0.01, and preferably greater than or equal to 0.02.

Further, in this process, in order to promote the filling of the resin for core formation into the concavities 12 by the capillary phenomenon, it is preferable to reduce the pressure of the entire system (approximately 0.1 to 200 Pa).

Further, in order to promote the above filling, in addition to the aforementioned reduction in pressure of the system, lowering the viscosity by heating the resin for core formation is also an effective means.

When the resin for core formation is injected into the concavities 12 of the mold 10, the resin for core formation is cured.

Heat, ultraviolet light, radiation, electron beams, or the like are used to cure the resin for core formation, in accordance with the type of the injected resin for core formation. When an ultraviolet curable resin is used as the resin for core formation, the resin can be cured by an ultraviolet lamp, an ultraviolet LED, a UV illuminating device, or the like. Further, when using a heat curable resin, the resin can be cured by a means such as heating the mold 10 in an oven, or the like.

Figure 4A:
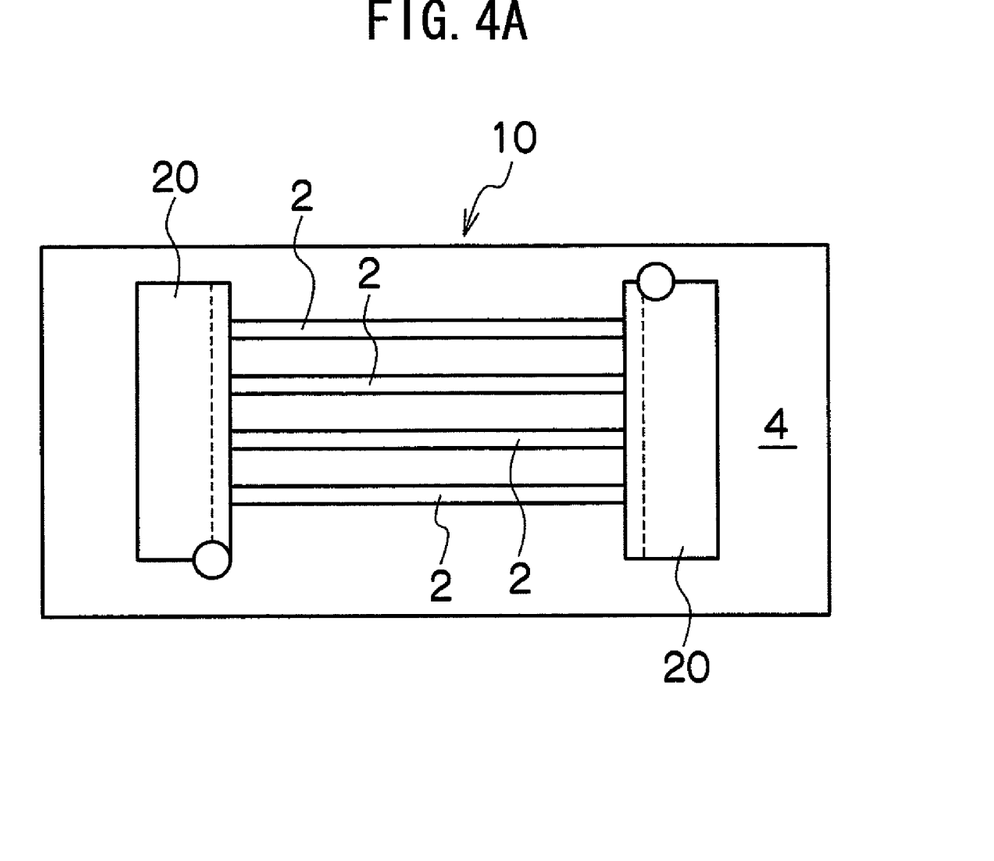
FIGS. 4A and 4B are plan views showing a state in which a main mold is removed after the resin for core formation has been cured.
Figure 4B:
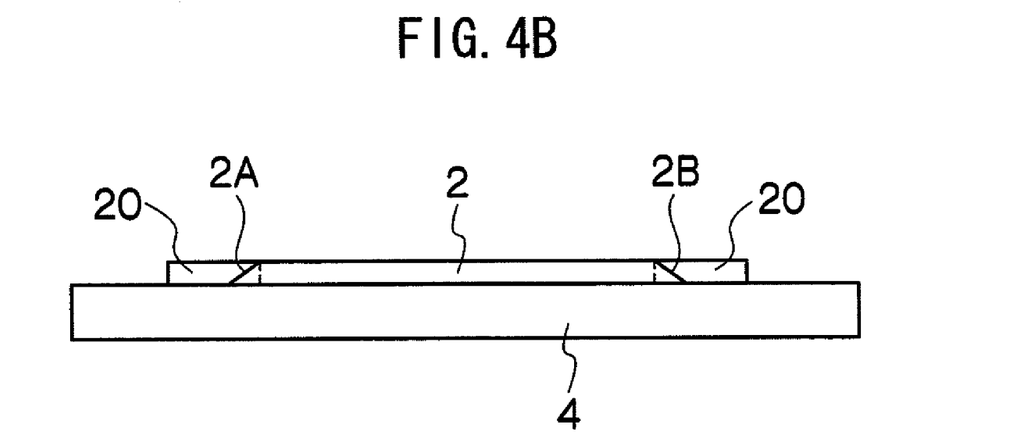

When the resin for core formation is cured, the main mold 11 is removed as shown in FIG. 4, and a clad layer 6 is formed at the surface of the clad base film 4 where the waveguide cores 2 are formed as shown in FIG. 5A and FIG. 5B. The clad layer 6 may be formed by layering a film which is similar to the clad base film 4, or a curable resin such as an ultraviolet curable resin, a photo-curable resin, a heat curable resin, a radiation curable resin, an electron beam curable resin or the like may be cast and cured. However, the refractive indices of the cured products of the aforementioned curable resins are smaller than that of the waveguide cores 2, and are preferably similar to that of the clad base film 4. Note that, in the example of FIGS. 5A to 5D, a curable resin is cast from above the waveguide cores 2 and the auxiliary molds 20, and a clad film 8 which is a film similar to the clad base film 4 is layered on from thereabove, and is cured so as to form the clad layer 6.

When the clad layer 6 is formed, as shown in FIG. 5C, the auxiliary peripheries are cut and removed by a dicing saw or the like, such that the polymer optical circuit 1 is formed.

Note that, as shown in FIG. 7A through 7D, a structure having the shape shown in FIG. 6E may be used as the auxiliary mold 20 which is positioned at the right side in the drawing, and the inclined mirror 2B and the convex lenses 2C may formed at the right side end portions, in the drawing, of the waveguide cores 2. Note that, in the example shown in FIGS. 7A through 7D, the inclined mirror 2A, the inclined mirror 2B and the convex lenses 2C are all exposed at the outer side of the clad layer 6.

Further, as shown in FIGS. 8A through 8D, by using a structure having a rectangular cross-section as the auxiliary mold 20 at the left side in the drawing, and using a structure having the shape shown in FIG. 6E as the auxiliary mold 20 at the right side in the drawing, a perpendicular surface is formed at the left side end portions, in the drawings, of the waveguide cores 2 and the inclined mirror 2B and convex lenses 2C are formed at the right side end portions, in the drawings, of the waveguide cores 2.

Figure 8A:
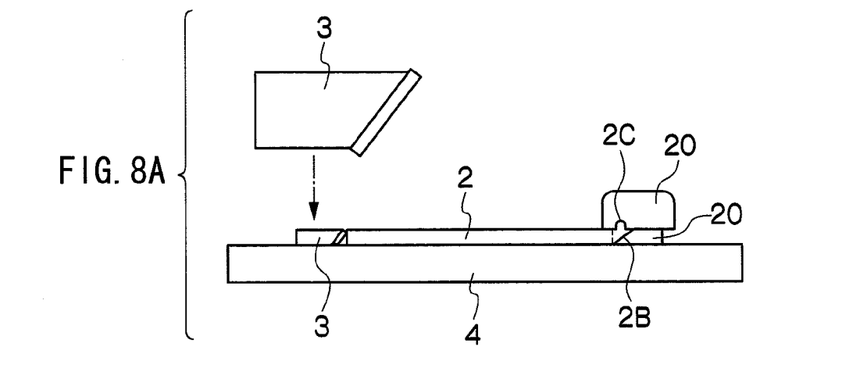
FIGS. 8A through 8D are flow diagrams showing yet another example of a polymer optical circuit fabricated by the fabricating method of the first exemplary embodiment, and the fabricating procedures thereof.

When the waveguide cores 2 are formed on the clad base film 4, as shown in FIG. 8A, only the auxiliary mold 20 which is positioned at the left side in the drawing with respect to the waveguide cores 2 is removed, and instead, a wavelength selecting filter 3 which selectively reflects light of a predetermined wavelength is disposed.

Figure 8B:
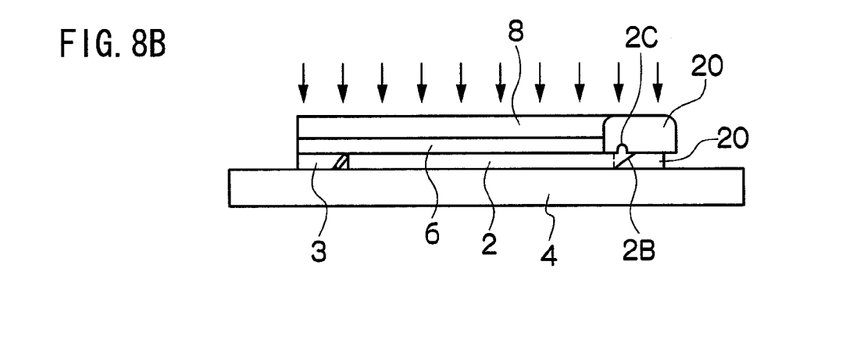

Next, as shown in FIG. 8B, a curable resin is cast onto the surface of the clad base film 4 at the side where the waveguide cores 2 are formed, and the clad film 8 is placed thereon from above. The curable resin is cured, and the clad layer 6 is formed.

Figure 8C:
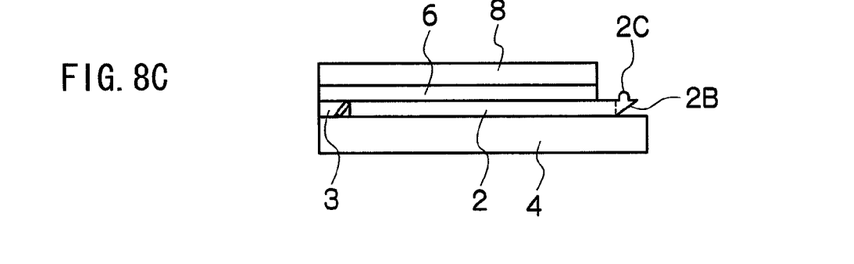
Figure 8D:
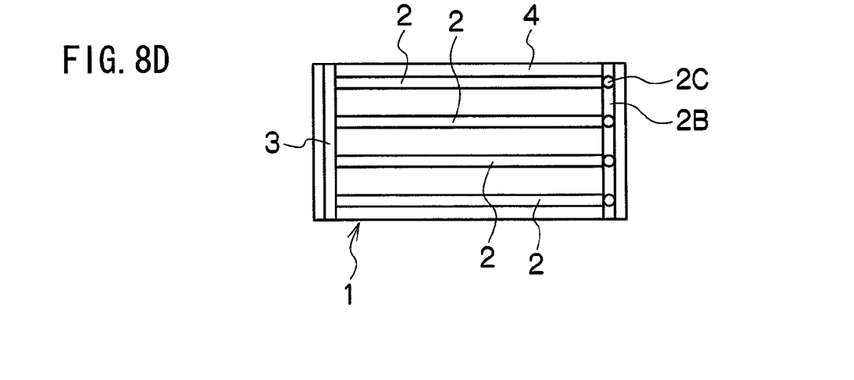
Figure 9A:
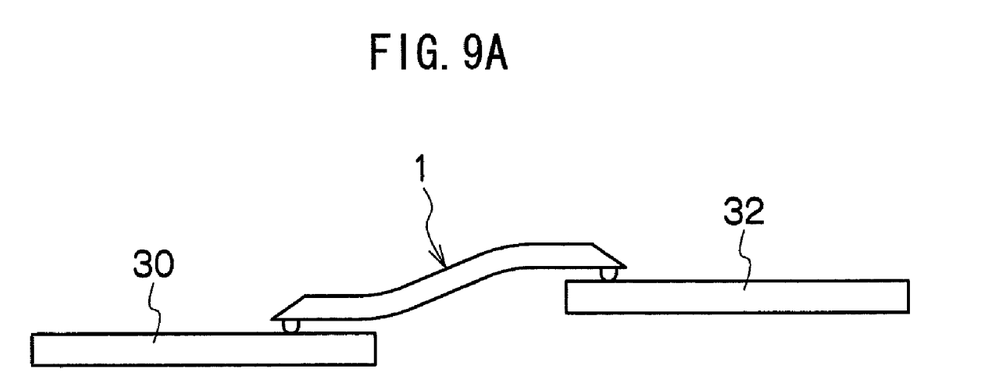
FIGS. 9A and 9B are schematic drawings showing an example of optically connecting two circuit substrates 30, 32 by the polymer optical circuit fabricated by the fabricating method of the first exemplary embodiment.
Figure 9B:
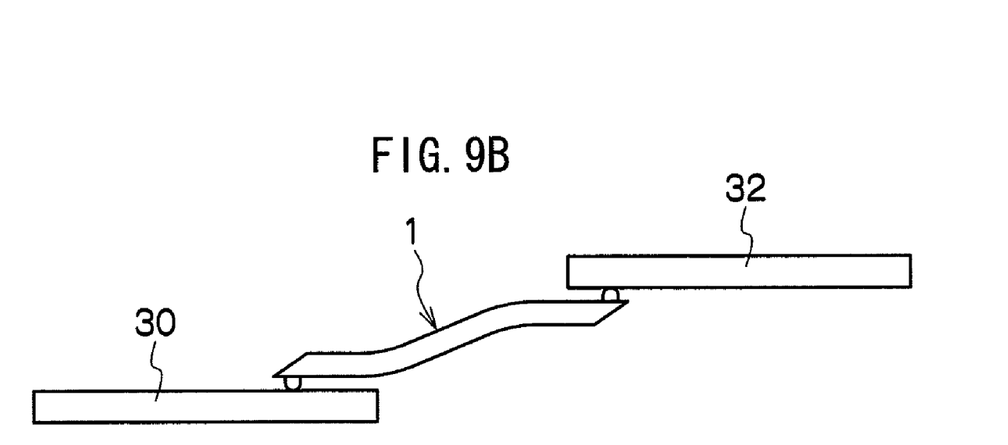

When the clad layer 6 is formed, as shown in FIG. 8C, the auxiliary mold 20 which is positioned at the right side in the drawing with respect to the waveguide cores 2 is removed, the periphery is trimmed, and the polymer optical circuit 1 is formed.

EXAMPLES

1. Example 1

The mold 10 is used in which structures of the form shown in FIG. 6A are turned upside-down and placed as the auxiliary molds 20 at the concavities 12B of the main mold 11 having the form shown in FIG. 1 through FIG. 3. At the main mold 11, the widths and depths of the concavities 12A are set such that the waveguide cores 2 of a core diameter of 50 μm are to be formed.

The surface of the mold 10 at the side where the concavities 12 are formed is stuck firmly to the clad base film 4 having a thickness of 50 μm and a refractive index of 1.51. Then, a resin for core formation (an epoxy ultraviolet curable resin, refractive index=1.53, viscosity=500 cPs) is injected into the concavities 12 from the injection hole 13A, and simultaneously, negative pressure of 100 hPa is applied to the suction hole 13B and suctioning is carried out for 5 minutes, and the resin for core formation is injected into the concavities 12.

When the resin for core formation is filled into the entire concavities 12, ultraviolet light of a wavelength of 365 nm and a light intensity of 50 mW/cm$^2$ is illuminated onto the mold 10 for 5 minutes, and the resin for core formation is cured.

When the resin for core formation is cured, the main mold 11 is removed such that the central portions of the waveguide cores 2 are exposed, and in the state in which the left and right auxiliary molds 20 remain, an ultraviolet curable resin (an epoxy resin, refractive index=1.51) is cast, and the clad film 8 of a thickness of 50μ and a refractive index of 1.51 is affixed. Then, ultraviolet light of a wavelength of 365 nm and a light intensity of 50 mW/cm$^2$ is illuminated for 5 minutes, and the layer of the ultraviolet curable resin is cured and the clad layer 6 is formed.

When the clad layer 6 is cured, the auxiliary molds 20 are removed, the peripheries are punched by a Thompson blade, and a rectilinear waveguide array at which the inclined mirrors 2A, 2B are formed at the both ends of the waveguide cores 2 is obtained as the polymer optical circuit 1. The length of the waveguide cores at the completed polymer optical circuit is approximately 7 cm, and the insertion loss is 1.5 dB.

2. Example 2

A structure having the form shown in FIG. 6F is used as the auxiliary mold 20 that is attached by insertion in the left side concavity 12B in FIG. 1 of the main mold 11. A structure having the form shown in FIG. 6E is used as the auxiliary mold 20 that is attached by insertion in the right side concavity 12B in FIG. 1. The thickness of each of the auxiliary molds 20 is 100 μm, and therefore, the depths of the concavities 12B also are 100 μm.

A rectilinear waveguide array, at which the 45° mirror 2A is formed at the one end portion and the 45° mirror 2B and the convex lenses 2C are formed at the other end portion as shown in FIGS. 7A through 7D, is formed as the polymer optical circuit 1 by procedures which are the same as Example 1 other than the above-described points. The length of the waveguide cores 2 of the polymer optical circuit 1 is 7 cm, the diameter of the convex lenses 2C is 50 μm, and the height of the convex lenses 2C is 5 μm. When light from a VCSEL is incident from the convex lenses 2C and is received beneath the inclined mirror 2A, the insertion loss is 1.2 dB.

3. Example 3

As shown in FIG. 8A through 8D, the wavelength selecting filter 3 is stuck firmly to the left ends of the waveguide cores 2 at an angle of 45° with respect to the optical axes of the waveguide cores 2, and the clad layer 6 is formed by the same processes as in Example 2. A filter, which has a thickness of 20 μm and in which a dielectric multilayer film is laminated on a polyimide film, is used as the wavelength selecting filter. At the wavelength selecting filter 3, the separation ratio of light of a wavelength of 760 nm and light of a wavelength of 850 nm, when incident perpendicularly, is 40 dB.

The length of the waveguide cores 2 of the obtained polymer optical circuit 1 is 4 cm. The convex lenses 2C at the right ends of the waveguide cores 2 have diameters of 50 μm and heights of 5 μm.

When light from a VCSEL is incident from the convex lenses 2C and is received beneath the left side end portions of the waveguide cores 2, light of a wavelength of 790 nm passes through the wavelength selecting filter 3, and light of a wavelength of 850 nm is reflected at the wavelength selecting filter 3. The separation ratio of the two types of light is 15 dB.

As described above, in accordance with one aspect of the present invention, even in cases in which one or both end portions of the waveguide core has a predetermined shape, the surface roughnesses of the main mold and the auxiliary mold are transferred as is to the waveguide core. Therefore, if the surface roughness of the auxiliary mold can be made to be, for example, less than or equal to 1/10 of the wavelength of the light that is transmitted through the waveguide core, a dicing process at the end portion can be omitted.

In a second aspect of the present invention, in the method of fabricating a polymer optical circuit relating to the first aspect, the auxiliary mold has a shape corresponding to an inclined mirror, a convex lens, or a combination of an inclined mirror and a convex lens, formed at the end portion of the waveguide core.

In a third aspect of the present invention, in the method of fabricating a polymer optical circuit relating to the second aspect, inclined mirrors are formed at both ends of the waveguide core, and the inclined mirrors are formed such that, at one end and at another end of the waveguide core, reflecting directions of the inclined mirrors are directions that are opposite one another in a top-bottom direction of a waveguide.

In a fourth aspect of the present invention, in the method of fabricating a polymer optical circuit relating to the second aspect, inclined mirrors are formed at both ends of the waveguide core, and the inclined mirrors are formed such that, at one end and at another end of the waveguide core, reflecting directions of the inclined mirrors are directions that are a same direction in a top-bottom direction of a waveguide.

In a fifth aspect of the present invention, in the method of fabricating a polymer optical circuit relating to any one of the first through fourth aspects, after the waveguide core is formed, a remaining portion of the clad is formed in a state in which the auxiliary mold remains, and thereafter, the auxiliary mold is removed.

A sixth aspect of the present invention relates to a method of fabricating a polymer optical circuit having a waveguide core whose one or both end portions have a predetermined shape, and a clad surrounding the waveguide core, the method including: structuring a mold by a main mold made of an elastomer for mold formation and having: a concavity corresponding to a portion of the waveguide core except for the end portion of the specific shape, an injection hole for injecting a resin for core formation into the concavity, and a suction hole for suctioning-out the resin for core formation injected in the concavity from the injection hole, and end portion forming parts forming the end portion of the predetermined shape of the waveguide core; firmly sticking a clad base film, that structures a portion of the clad, to a surface of the mold at a side where the concavity is formed; filling a resin for core formation into the concavity by injecting the resin for core formation into the concavity from the injection hole of the mold and suctioning the resin for core formation from the suction hole; and forming a waveguide core by curing the resin for core formation.

In accordance with the second aspect, an optical member, such as an inclined mirror or a convex lens or the like, can be formed at the end portion of the waveguide core without a dicing process.

In accordance with the third aspect, inclined mirrors whose reflecting directions are opposite one another can be formed at the both ends of the waveguide core without a dicing process.

In accordance with the fourth aspect, inclined mirrors whose reflecting directions are the same as one another can be formed at the both ends of the waveguide core without a dicing process.

In accordance with the fifth aspect, it is possible to fabricate a polymer optical circuit of a form in which, for example, the final end at the side where an inclined mirror or a convex lens is formed at the waveguide core, is exposed from the clad.

In accordance with the sixth aspect, the end portion of the waveguide core is formed by the end portion forming parts. Therefore, by finishing in advance such that the surface roughnesses of the light incident/exiting portion and the mirror of the end portion forming member parts are within a predetermined range or smaller, processing of the waveguide core by a dicing process can be omitted.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of fabricating a polymer optical circuit having a waveguide core, whose one or both end portions have a specific shape, and a clad, the method comprising:
   structuring a mold including:
      a main mold made of an elastomer for mold formation, light-transmissive in at least one of the ultraviolet region and the visible region, and having a first concavity portion corresponding to a portion of the waveguide core except for the end portion with the specific shape, a second concavity portion corresponding to the end portion with the specific shape, an injection hole for injecting a photo-curable resin into the concavities, and a suction hole for suctioning-out the resin, and
      an auxiliary mold made of an elastomer for mold formation and having a shape corresponding to the specific shape of the end portion of the waveguide core, wherein the auxiliary mold is arranged within the second concavity portion of the main mold;
   firmly sticking a clad base film, which structures a portion of the clad, to a surface of the mold at a side where the concavities are formed;
   filling the resin into the concavities by injecting the resin into the concavities from the injection hole of the mold and suctioning the resin from the suction hole;
   forming the waveguide core by photo-curing the resin;
   removing the main mold;
   forming additional clad on the exposed portion of the waveguide core; and
   subsequently removing the auxiliary mold.

2. The method of fabricating a polymer optical circuit of claim 1, wherein the shape of the auxiliary mold corresponds to an inclined mirror, a convex lens, or a combination of an inclined mirror and a convex lens that is formed at the end portion of the waveguide core.

3. The method of fabricating a polymer optical circuit of claim 2, wherein inclined mirrors are formed at both ends of the waveguide core, the inclined mirror at one end of the waveguide core reflects light in a first direction orthogonal to the waveguide core, and the inclined mirror at the other end of the waveguide core reflects light in a second direction that is opposite to the first direction.

4. The method of fabricating a polymer optical circuit of claim 2, wherein inclined mirrors are formed at both ends of the waveguide core, the inclined mirror at one end of the waveguide core reflects light in a first direction orthogonal to the waveguide core, and the inclined mirror at the other end of the waveguide core reflects light in a second direction that is the same as the first direction.

5. A method of fabricating a polymer optical circuit having a waveguide core, whose one or both end portions have a specific shape, and a clad, the method comprising:
   structuring a mold including:
      a main mold made of an elastomer for mold formation, light-transmissive in at least one of the ultraviolet region and the visible region, and having a concavity corresponding to a portion of the waveguide core except for the end portion with the specific shape, an injection hole for injecting a photo-curable resin into the concavity, and a suction hole for suctioning-out the resin, and
      an end portion forming part which forms the end portion of the waveguide core with the specific shape;
   firmly sticking a clad base film, which structures a portion of the clad, to a surface of the mold at a side where the concavity is formed;
   filling the resin into the concavity by injecting the resin into the concavity from the injection hole of the mold and suctioning the resin from the suction hole;
   forming the waveguide core by photo-curing the resin;
   removing the main mold;
   forming additional clad on the exposed portion of the waveguide core; and
   subsequently removing the auxiliary mold.

* * * * *